Jan. 3, 1928.
E. F. CROW
1,655,311
ANIMAL POKE
Filed Jan. 17, 1927
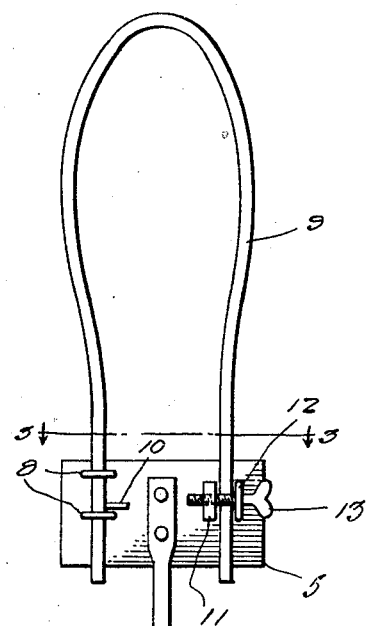
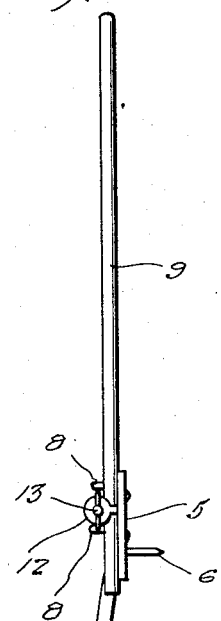
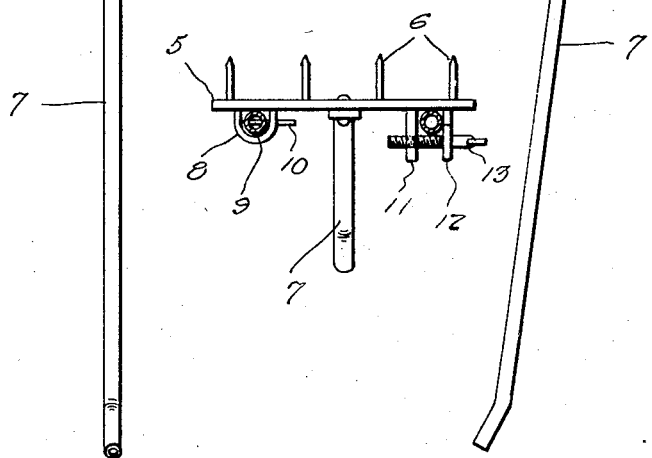
Inventor
*Elias F. Crow*
By *Clarence A. O'Brien*
Attorney Patented Jan. 3, 1928.

1,655,311

UNITED STATES PATENT OFFICE.

ELIAS F. CROW, OF FINDLAY, OHIO.

ANIMAL POKE.

Application filed January 17, 1927. Serial No. 161,614.

This invention relates to new and useful improvement in animal pokes, and has for its primary object to provide a device which is simple in construction, inexpensive, strong and durable.

In carrying out the present invention I provide highly novel and simple means for engagement around the neck of the animal and having spikes or prongs at the lower end thereof together with means depending downwardly in front of the fore legs of the animal with the end in view that should the animal attempt to pass through a fence or the like, said means will engage the same and cause the spurs or prongs to engage the chest causing pain, with the result that the animal will make no further advances in the direction of the fence.

The invention further aims to provide a neck yoke so associated with the remaining elements of the device to facilitate the easy application of the poke to the animal's neck.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a front elevation of an animal poke constructed in accordance with the present invention.

Figure 2 is an edge elevation thereof, and

Figure 3 is a horizontal section taken substantially upon the line 3—3 of Figure 1, and looking downwardly in the direction of the arrows.

Now having reference to the drawing, my novel cattle poke consists of a small substantially rectangular shaped plate 5 of wood, metal, or other suitable material upon the inner face of which are spikes, prongs, or the like designated 6. Rigidly secured at one end to the front face of this plate 5 is a relatively elongated depending and forwardly inclined bar 7 for a purpose hereinafter more fully described.

At one side of the bar 7 the plate 5 is equipped with a pair of vertically spaced eyes 8—8 within which is loosely mounted one end of a vertically extending relatively U-shaped animal neck engaging yoke 9 preferably of tubular formation as disclosed in the sectional view, Figure 3. Between these eyes 8—8 said yoke is provided with a removable pin 10 for limiting the outward swinging movement of said leg of the yoke with respect to said plate 5, and also for preventing the detachment of the yoke from said plate.

At the opposite side of the bar 7 is a forwardly projecting lug 11 formed with a threaded opening, while in outwardly spaced relation therewith is an eye 12. Passing through this eye and threaded within the threaded opening of the lug 11 is a wing headed elongated screw 13 for the purpose of securing the adjacent leg of the yoke to the plate when said yoke is so swung as to engage the leg between the lug and the eye 12.

It will be at once apparent that by releasing the screw 13, the yoke may be swung so that one leg thereof will be spaced from the plate so as to facilitate the disposition of the yoke upon the animal's neck. After the yoke has been properly positioned, the plate 5 may be swung into engagement with the free leg of the yoke and secured thereto by reason of said screw 13. When attached, should the animal attempt to pass through a fence, the end of the bar 7 will engage therewith for causing the inward swinging movement of the plate 5 and the consequent pricking of the animal by the spurs or prongs 6.

Even though I have herein shown and described the invention as consisting of certain detail structural elements it is nevertheless to be understood that some changes may be made therein without effecting the spirit and scope of the appended claims.

Having thus described the invention, what I claim is:—

1. In an animal poke of the class described, a plate, spurs extending from the inner face of said plate, a neck engaging yoke, a pivotal connection between one leg of the yoke and the outer face of the plate whereby the yoke may be readily applied to the neck of the animal, a pair of apertured members extending laterally from the outer face of the plate and between which the free leg of the yoke is to be disposed, a removable locking element extending through the apertured members to rigidly secure the free leg of the yoke to said plate, and a fence engaging bar depending from the plate.

2. In an animal poke of the class described, a plate, spurs arranged on the inner face of the plate, a pair of vertically alined eyelets secured on the outer face of the plate, a neck engaging yoke, one leg of the yoke extending through said registering eyelets, a laterally projecting pin carried by the aforementioned leg for disposition between the eyelets, said yoke being capable of vertical swinging movement with respect to the plate whereby the yoke may be readily applied to the neck of the animal, a lug extending laterally from the outer face of the plate and provided with a threaded aperture, an eyelet arranged in parallel spaced relation with respect to said lug, the other leg of the yoke being disposed between the lug and the adjacent eyelet, a screw extending through the eyelet and threaded through the opening in the lug to rigidly secure the free leg of the yoke against the plate, and a fence engaging bar depending from the plate.

In testimony whereof I affix my signature.

ELIAS F. CROW.